United States Patent
Kapeliouchko et al.

(10) Patent No.: US 6,790,932 B2
(45) Date of Patent: Sep. 14, 2004

(54) PROCESS FOR OBTAINING NON THERMOPROCESSABLE FINE POWDERS OF HOMOPOLYMER OR MODIFIED PTFE

(75) Inventors: Valery Kapeliouchko, Alessandria (IT); Hua Wu, Milan (IT); Giovanna Palamone, Alessandria (IT)

(73) Assignee: Ausimont S.p.A., Milan (IT)

( * ) Notice: Subject to any disclaimer, the term of this patent is extended or adjusted under 35 U.S.C. 154(b) by 66 days.

(21) Appl. No.: 10/202,852

(22) Filed: Jul. 26, 2002

(65) Prior Publication Data

US 2003/0088055 A1 May 8, 2003

(30) Foreign Application Priority Data

Jul. 26, 2001 (IT) ...................................... MI2001A1615

(51) Int. Cl.$^7$ ............................................. C08F 214/18
(52) U.S. Cl. ................... 528/480; 528/481; 528/502 F; 528/502 R; 524/545; 526/250
(58) Field of Search ............................ 528/502 F, 480, 528/502 R, 481; 524/545; 526/250

(56) References Cited

U.S. PATENT DOCUMENTS

| | | | | |
|---|---|---|---|---|
| 2,593,583 A | | 4/1952 | Lontz | 260/92.1 |
| 3,046,263 A | * | 7/1962 | Whitlock | 528/480 |
| 3,046,283 A | | 7/1962 | Whitlock | 260/92.1 |
| 3,752,789 A | | 8/1973 | Khan | 260/47 |
| RE30,378 E | * | 8/1980 | Bice et al. | 528/486 |
| 4,675,380 A | * | 6/1987 | Buckmaster et al. | 528/481 |
| 4,864,006 A | | 9/1989 | Giannetti et al. | 526/209 |
| 4,990,283 A | * | 2/1991 | Visca et al. | 516/30 |
| 5,077,359 A | * | 12/1991 | Moore | 526/206 |
| 5,391,709 A | | 2/1995 | Egres, Jr. et al. | 528/483 |
| 5,463,021 A | * | 10/1995 | Beyer et al. | 528/482 |
| 6,593,416 B2 | * | 7/2003 | Grootaert et al. | 524/545 |

FOREIGN PATENT DOCUMENTS

| | | |
|---|---|---|
| EP | 0 969 027 A1 | 1/2000 |
| EP | 1 065 223 A1 | 1/2001 |

* cited by examiner

*Primary Examiner*—Henry S. Hu
(74) *Attorney, Agent, or Firm*—Arent Fox PLLC.

(57) ABSTRACT

A process for obtaining non thermoprocessable fine powders of homopolymer or modified PTFE, comprising the following steps:

A) obtaining of the polymer latex under the gel form;
B) washing of the polymer gel with acid aqueous solutions or neutral aqueous solutions;
C) granulation of the gel washed by mechanical stirring, at a specific power in the range 1.5–10 kW/m$^3$, until flotation of the PTFE fine powder, and separation of the floated fine powder;
D) drying in an aerated oven of the floated fine powder at a drying temperature in the range 90° C.–160° C.

21 Claims, No Drawings

PROCESS FOR OBTAINING NON THERMOPROCESSABLE FINE POWDERS OF HOMOPOLYMER OR MODIFIED PTFE

The present invention relates to a non thermoprocessable fine powder of homopolymer or modified PTFE as defined below, and to the process thereof, via powder to be used in the lubricated extrusion wherein also low extrusion pressures can be used. The manufactured articles obtainable from said fine powders have a high purity degree and are surface defect free, such for example cracks, roughness.

It is known that the polytetrafluoroethylene manufactured articles are obtained in various forms, such for example, pipes, cables, wires or tapes, subjecting the PTFE fine powders to a lubricated extrusion process. Generally, a higher extrusion pressure leads to a defect increase of the extruded manufactured article, whereby it is always preferable to work I at a low extrusion pressure. Before extrusion it is necessary to subject the fine powders to drying. The extrusion pressure results depend on the temperature at which drying is carried out. The higher the drying temperature, the higher the polymer particle coalescence degree whereby it will be necessary a higher extrusion pressure. Therefore it is extremely advantageous to be able to dry the fine powder at a lower temperature, to work at low extrusion pressures. The PTFE fine powder obtained at lower drying temperatures results suitable to be extruded with a sufficiently low pressure, obtaining extruded manufactured articles surface defect free, such for example cracks, roughness.

It is known that the PTFE fine powders are obtained by the polymerization in dispersion (emulsion). In said process a sufficiently high amount of surfactant is used so to be able to stabilize the PTFE colloidal particles and a mild stirring is applied so to avoid the polymer coagulation. In the dispersion polymerization process stabilizers, initiators and other additives (for example nucleants such as $ZnCl_2$) are added to control the polymer particle diameter. Then the latex obtained from said process is coagulated, and the obtained powder is called "fine powder". The known conventional coagulation process comprises the following steps:

latex dilution with water and optional addition of a destabilizing electrolyte to coagulate the latex;
latex mechanical stirring which causes the aggregation of the colloidal particles and leads first to gelification then to granulation and lastly to flotation;
separation of the wet fine powder from the coagulum water;
optional polymer washing, under powder form, for several times with water to reduce the electrolyte concentration in the powder;
optionally drying of the fine powder.

In the dispersion polymerization process of PTFE, surfactants and polymerization initiators are commonly used, for example persulphates, which after the polymerization process remain in the latex. The polymer obtained from this conventional process is therefore contaminated by the initiator and surfactant. For said reasons the PTFE fine powders cannot be used for the porous manufactured article production, for example defect free thin membranes. Furthermore said fine powders cannot be used in the production of manufactured articles for the semicon industry. In fact, as well known, in the applications concerning the semicon industry, a high purity degree of the polymer is required, in particular having a content of residual cations <1 ppm, and of anions (in particular sulphates <1 ppm).

In U.S. Pat. No. 3,046,263 a continuous coagulation process of the PTFE latexes is described, comprising
a phase of strong mechanical stirring with a specific power of 1–100 (CV×sec)/gallon (196 kJ/m$^3$–19,600 kJ/m$^3$), preferably using a centrifugal pump with average residence time of the latex in the pump of 2 seconds;
passing through a capillary tube with hydraulic resistance of 0.5–20 p.s.i. (3.4–136 kPa);
granulation in the presence of air by mechanical stirring with specific power of 0.25–50 (CV×sec)/gallon (49 kJ/m$^3$–9,800 kJ/m$^3$) with subsequent separation of the fine powder from water.

The use of the mechanical stirring with so high specific powers (~98 kW/m$^3$–9,800 kW/m$^3$) by a centrifugal pump, which has a wide distribution of the residence times, causes a too compact structure of the fine powder, which does not mixes well with the lubricant and does not allow to work at low pressure in the lubricated extrusion process as described hereafter.

In U.S. Pat. No. 5,391,709 a purification process of the PTFE fine powders from contaminants is described, wherein a thin layer of fine coagulated powder is put on the surface of a polymer tissue and subsequently exposed to a hot air flow, which passes through the fine powder layer flowing from the upper part to the lower part. In said process the drying temperature is in the range 110°–200° C., preferably 160°–200° C. Tests carried out by the Applicant (see comparative Examples) show that by operating under the conditions described in this patent, a product free from initiator salts is not obtained; in fact the residual cation content is higher than 1 ppm, the residual anion content (sulphate) is higher than 1 ppm. Therefore the purification process described in said patent is not suitable to obtain manufactured articles usable in the semicon industry, which requires a residual cation content <1 ppm and a residual anion content (sulphate) <1 ppm. Besides, said patent refers to PTFE fine powders coagulated with the conventional coagulation process, as above described. Tests carried out by the Applicant (see comparative Examples) show that by subjecting said PTFE fine powder to the purification process indicated in said patent wherein the drying temperature is lower than 160° C., a product still containing some surfactant is obtained. Therefore the manufactured articles obtainable under said conditions have not the purity requirements to be used in the semicon industry. In fact it is necessary to work at a drying temperature of 190° C. to obtain a product purified from the surfactant. However in the extrusion phase the purified product according to said patent requires high extrusion pressures since the drying temperature is high. Therefore the purification process described in said patent does not allow to obtain a fine powder which can be subjected to low extrusion pressures.

The need was felt to have available non thermoprocessable fine powders of homopolymer or modified PTFE as defined below, which can be subjected to subsequent extrusion using low extrusion pressures. The obtainable manufactured articles have a high purity degree, are surface defect free, such for example cracks and roughness, and are used for the application in the semicon industry.

The Applicant has surprisingly found a purification process of homopolymer or modified PTFE which allows to obtain PTFE fine powders with the above advantages.

It is therefore an object of the present invention a process to obtain non thremoprocessable fine powders of homopolymer or modified PTFE, comprising the following steps:
A) obtaining of the polymer latex under the gel form;

B) washing of the polymer gel with acid aqueous solutions or neutral aqueous solutions, having a pH from 0.5 to 7, preferably from 1 to 4;

C) granulation of the washed gel by mechanical stirring, at a specific power in the range 1.5–10 kW/m$^3$, until flotation of the PTFE fine powder, and separation of the floated fine powder;

D) drying in an aerated oven of the floated fine powder at a drying temperature in the range 90° C.–160° C., preferably 105° C.–150° C.

The process of the present invention allows to obtain PTFE fine PTFE powders suitable for low pressure extrusion. The powders ar substantially free from inorganic cations and from surfactants.

The fine powders of PTFE or PTFE modified after step D), as said, are substantially free from inorganic cations (residual amount <1 ppm), substantially free from inorganic sulphates (residual amount <1 ppm), and contain polymerization surfactants in an amount lower than the analytical detectable limits (<10 ppm, determined as indicated in the characterization methods).

Unexpectedly it has been found that by the process of the invention the polymerization surfactant is easily eliminated during the drying step D) at low temperature.

The process of the present invention can be carried out in batch or in a continuous way on PTFE or PTFE modified latexes as defined below.

When the process of the present invention is carried out in batch, step A) for obtaining the polymer latex under gel form comprises the following steps:

dilution of the latex obtained from the polymerization in dispersion a concentration from 2 to 25% by weight of PTFE, preferably from 8 to 20% by weight of PTFE; the dilution being carried out by addition of water at a temperature such that the temperature of the diluted latex is from 5° C. to 35° C., preferably from 15° C. to 30° C.;

optionally, the filtration of the diluted latex is carried out to remove the particle aggregates in case formed;

subsequent latex mechanical stirring using a specific power from 1.5 to 10 kW/m$^3$;

addition of an acid electrolyte, preferably nitric acid, until obtaining a dispersion having pH from 0 to 3.5, preferably from 1 to 3;

keeping of the mechanical stirring at the specific power from 1.5 to 10 kW/m$^3$, until gel formation.

By gels it is meant that the polymer particles are dipped in the liquid phase and linked by crossed bonds so to form a thick network. The gel properties significantly depend on the interactions of said two components (polymer and liquid). In fact the retained liquid prevents the polymer network from being transformed into a compact mass and the network prevents the liquid from coming out from the gels. Depending on the chemical composition and on other process parameters, such for example the solid and electrolyte concentration, the gel consistence can vary from a viscous fluid to a rather stiff solid.

In the batch process, when the polymer has been obtained under the gel form, the subsequent washing step B) comprises the following steps:

1) mechanical stirring stop and addition of an aqueous solution as indicated in B). The added aqueous solution amount is generally from 100 to 200 parts by volume of solution for 100 parts by volume of polymer gel;

2) subsequent gel mechanical stirring using a specific power generally in the range 0.2–2 kW/m$^3$, for a time generally from 1 to 10 minutes; under said conditions the gel is shattered into small masses, but at the same time the contact between gel and air is minimized, obtaining flocks which maintain the hydraulic contact with water without floating;

3) stirring stop, gel flock decantation and removal of the supernatant water.

Steps 1)–3) are repeated until complete removal of the inorganic cations from the gel phase, i.e. until a residual amount of cations lower than 1 ppm. In practice after step 3) the residual cations are substantially absent. It has been found that also the residual sulphates are substantially absent (<1 ppm after step 3). The washing step B) is repeated from 1 to 10 times, preferably from 3 to 8 times.

When the gel washing is carried out until substantial removal of the residual cations, one proceeds with the subsequent granulation step C) of the washed gel, comprising the following steps:

mechanical stirring of the washed gel by using a specific power from 1.5 to 10 kW/m$^3$, optionally adding other acid electrolyte; the gel temperature is from 5° C. to 35° C., preferably from 15° C. to 30° C.; the mechanical stirring is continued until the complete granulation and flotation of the fine powder;

stirring stop and separation of the aqueous phase underlying the floated fine powder.

The obtained fine powder is subjected to drying step D) in an aerated oven. The oven must be resistant to acid vapours.

As said, the process of the present invention can be carried out also in a continuous way. In this case the polymer latex under gel form (step A) is preferably obtainable through the following steps:

a1) dilution in a lift of a PTFE latex obtained from the polymerization in dispersion (emulsion) to a concentra- from 5 to 25% w/w of PTFE, optional filtration of the diluted latex, b1) latex pressurization in the lift by an inert gas, until a pressure, referred to the atmospheric pressure, in the range 3–40 kg/cm$^2$ (0.3–4 MPa), c1) addition of a solution of an acid electrolyte, preferably nitric acid, to the PTFE latex, in a in-line mixer, so that the pH is from 1 to 4, d1) latex flowing from the mixer through a capillary tube for the gel obtaining.

When the polymer under the gel form has been obtained, one proceeds to the subsequent washing step B) as above described in the case of the batch process.

To carry out the process in a continuous way, at the end of step b1), while the previously pressurized latex is discharged in the mixer of step c1), a second lift is used which is fed with latex to be diluted according to step a1). When the first lift has been emptied, the latex fed in the second lift is at the end of step b1), and therefore the latex is fed again in the first lift.

As said, fine powders of homopolymer and modified PTFE as defined below, obtained by the process of the present invention, by lubricated extrusion using low extrusion pressures, allow to obtain manufactured articles free from inorganic contaminants and from surface defects. Therefore, the obtained manufactured articles can be used in applications wherein a high purity of polytetrafluoroethylene or modified PTFE is required, such for example in the semicon industry.

In the case of non thermoprocessable fine powders of modified PTFE, the polymer contains small amounts of comonomers having at least one unsaturation of ethylene type in an amount from 0 to 3% by moles, preferably from 0.01 to 1% by moles.

The comonomers which can be used are of both hydrogenated and fluorinated type. Among hydrogenated comonomers, ethylene, propylene, acrylic monomers, for example methyl methacrylate, (meth)acrylic acid, butylacrylate, hydroxyethyl hexylacrylate, styrene monomers, such for example styrene, can be mentioned. Among fluorinated comonomers it can be mentioned:

- $C_3$–$C_8$ perfluoroolefins, such hexafluoropropene (HFP);
- $C_2$–$C_8$ hydrogenated fluoroolefins, such vinyl fluoride (VF), vinylidene fluoride (VDF), trifluoroethylene, hexafluoroisobutene, perfluoroalkylethylene $CH_2$=CH-$R_f$, wherein $R_f$ is a $C_1$–$C_6$ perfluoroalkyl;
- $C_2$–$C_8$ chloro- and/or bromo- and/or iodo-fluoroolefins, such as chlorotrifluoroethylene (CTFE);
- (per)fluoroalkylvinylethers (PAVE) $CF_2$=$CFOR_f$, wherein $R_f$ is a $C_1$–$C_6$ (per)fluoroalkyl, for example $CF_3$, $C_2F_5$, $C_3F_7$;
- (per)fluoro-oxyalkylvinylethers $CF_2$=CFOX, wherein X is: a $C_1$–$C_{12}$ alkyl, or a $C_1$–$C_{12}$ oxyalkyl, or a $C_1$–$C_{12}$ (per)fluorooxyalkyl having one or more ether groups, for example, perfluoro-2-propoxy-propyl; fluorodioxoles, preferably perfluorodioxoles;
- fluorovinylethers (MOVE) of general formula: $CFX_{AI}$=$CX_{AI}OCF_2OR_{AI}$ (A–I) wherein $R_{AI}$ is a $C_2$–$C_6$ linear, branched or $C_2$–$C_6$ cyclic (per)fluoroalkyl group, or a $C_2$–$C_6$ linear, branched (per)fluorooxyalkyl group, containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}$=F, H; the compounds of general formula $CFX_{AI}$=$CX_{AI}OCF_2OCF_2CF_2Y_{AI}$ (A-II), wherein $Y_{AI}$=F, $OCF_3$; $X_{AI}$ as above are preferred; in particular (MOVE I) $CF_2$=$CFOCF_2OCF_2CF_3$ (A-III) and (MOVE II) $CF_2$=$CFOCF_2OCF_2CF_2OCF_3$ (A-IV) are preferred.

The process of the invention is highly effective, since the polymer losses in the purification process carried out according to the present invention are negligible, of the order of 0.1% by weight of PTFE.

Among the preferred acid electrolytes, nitric, hydrochloric acids can be mentioned, nitric acid is preferred.

As said, the drying oven must be resistant to acids. The drying temperature is preferably from 105° to 150° C. The productivity in the process of the present invention can be increased by increasing the thickness of the powder put on the support for drying. The Applicant has surprisingly found that said thickness increase does not cause coloration problems or anyway a worsening of the purification process. Used thicknesses can also be of 5–6 cm.

In drying step D), among the preferred used substances which are put at direct contact with the PTFE fine powder, substances resistant to nitric acid in the temperature range from 105° C. to 150° C. can be mentioned. Fluoropolymers such PTFE, PVDF, FEP (optionally modified with vinylethers), PFA, MFA, or PEEK, can for example be mentioned. Other hydrogenated polymers such as for example PET and PPS have not been found usable.

The polymer latex from which gels are obtained as above described, is obtained from polymerization in dispersion (emulsion) of TFE, optionally in the presence of comonomers as said above. The primary particles of the latex polymer have sizes from 0.1 to 0.4 micron. The process for the latex obtaining can also be carried out in microemulsion. See for example U.S. Pat. No. 4,864,006, U.S. Pat. No. 4,990,283 and EP 969,027. In this case the diameter of the primary particles of the latex ranges from 0.01 to 0.1 micron.

The present invention will now be better illustrated by the following embodiment Examples, which have a merely indicative but not limitative purpose for the scope of the invention itself.

EXAMPLES

Characterization Methods

Surfactant Quantitative Determination

The surfactant amount in both dry and wet powder, has been determined by gas-chromatographic analysis of the corresponding methyl ester, according to the following procedure:

0.5 g of powder are wetted with ethanol and brought to basic pH with a $NH_4OH$ solution. The powder is dried under nitrogen flow. To the dried powder 2 ml of acid methanol are added. Esterification is carried out at 70° C. for 16 hours in hermetically sealed test tube. At this point 0.5 ml of Delifrene® A113 and 4 ml of water are added to the mixture.

The mixture is stirred and let stand. 2 phases separate, 1 μl of the lower fluorinated phase containing the surfactant ester is drawn. The solution is injected in a gas-cromatograph with capillary column (capillary gaschromatographic system equipped with introduction split/splitless set 200°—Capillary column type CP-SIL 8CB 25 cm×0.32 mm×1.3 μm Carrier helium=50 KPa slpitting flow 26 ml/min—Make-up carrier: nitrogen 40 KPa.—Introduced volume 1 μl—Temperature profile 40° C.×4', 40°/' up to 60°, 8°/' up to 84°, 40°/' up to 220×10'.—FID detector set at 250° C. (Air/hydrogen ratio=100/90 KPa)—Electrometer: Range 0, AT 0).

The peak area is converted into the present surfactant amount by calibration curve.

The surfactant used for obtaining the latex of the Examples is the ammonium perflucrooctanoate salt (PFOA). The determination method detectable limit is 10 ppm.

Cation Determination

Cations are determined by Atomic Absorption spectroscopy by flame. Fe cation is that present in higher amounts, since the Mohr salt (iron salt) is used as reducing agent in polymerization for obtaining latexes. For said reason only this cation is reported in the Tables. The method used to determine the various cations is herein exemplified for the Fe ion, the same method is repeated for the other cations.

1 g of powder is burnt in a Pt crucible at 700° C. The residue is treated with HCl 37% and brought to volume with water. The resulting suspension is filtered. The filtrate is subjected to analysis, read at air/acetylene flame with flow rate of 12 and 35 1/min respectively.

For the Fe reading (as $Fe^{3+}$) a HCl lamp at 248.3 nm is used.

The read value is converted into the Fe value by comparison with a standard amount read under the same conditions.

For the other cations the characteristic wave length of the single cations is used.

Rheometric Pressure Determination

The pressure is determined according to the ASTM D 1457-87 method. The used reduction ratio is 1:100.

Sulphate Determination

The sulphate amount has been determined in mother and washing water at equilibrium with the gel; the measured sulphate amount has been related to the powder polymer total amount. The sulphates are determined by ionic-chromatographic analysis: the mother water or the washing waters are directly injected in a liquid chromatograph Dionex 4500 equipped with a conductimetric cell.

The peak area is related to the sulphate amount in the water by calibration curve.

From the weight of the water removed after each washing the sulphate amount removed by each washing is obtained.

By subtracting the sulphate amount removed by water from the amount added in polymerisation the sulphate amount remaining on the polymer is obtained.

The sensitivity limit of the determination method is 0.05 ppm.

Example 1A
PTFE Latex Preparation 600 parts by weight of degassed water, 1.33 parts of an aqueous solution of ammonium perfluorooctanoate at 30% w/w in ammonium perfluorooctanoate, 3 parts of an aqueous solution of ammonium persulphate at 0.2% w/w in ammonium persulphate are fed into a reactor equipped with mechanical stirrer, previously put under vacuum. The reactor is pressurized with TFE up to a pressure of 20 bar (2 MpA) at a temperature of 30° C. Then 3 parts of an aqueous solution of $(NH_4)_2Fe(SO_4)_2 \times 6H_2O$ (Mohr salt) at a concentration of 0.3% by w. are fed.

When the pressure in the reactor has decreased of 0.5 bar ($5 \times 10^4$ Pa) one starts to feed TFE so as to maintain a constant pressure of 20 bar inside the reactor. In the meantime the reactor internal temperature is increased up to 85° C. at a rate equal to 1° C./min. During the reaction 3.5 parts of the above ammonium perfluorooctanoate aqueous solution (surfactant) are fed into the reactor.

After 50 minute from the start, the TFE feeding is stopped, the reactor vented, cooled and lastly discharged. The discharged latex has a concentration of 510 g of PTFE/liter of water.

Example 1B
Preparation of PTFE Latex 600 parts by weight of degassed water, 0.67 parts of ammonium perfluorooctanoate as aqueous solution 30% w/w in ammonium perfluorooctanoate and 1 part of paraffin with softening point of 52–54° C. are fed into a reactor equipped with mechanical stirrer, previously put under vacuum. Then 0.13 parts of perfluoromethoxydioxole are fed. The reactor is pressurized with TFE up to a pressure of 20 bar at a temperature of 65° C. Then 1.25 parts of an aqueous solution containing ammonium persulphate at a concentration of 0.2% w/w and 4% of peroxydisuccinic acid are fed.

When the pressure in the reactor has decreased of 0.5 bar, TFE is fed to the reactor so as to maintain a constant pressure of 20 bar inside the reactor. In the meantime the internal temperature is increased up to 82° C. at a rate of to 0.5° C./min. During the reaction 6.67 parts of ammonium perfluorooctanoate as aqueous solution 30% w/w in ammonium perfluorooctanoate are fed into the reactor.

When the 80% of the conversion of TFE is achieved, 0.35 parts of hexafluoropropene are fed into the reactor. At 120 minutes from the start, the TFE feeding is stopped, the reactor vented, cooled and discharged. The discharged latex has a concentration of 32.4% by w. in PTFE.

The PFOA and sulphate amounts, expressed in ppm, based on the dry polymer weight, are the following:

Surfactant (Ammonium Perfluorooctanoate): 3990 ppm based on the dry polymer.

Sulphate: 7.02 ppm based on the dry polymer.

Example 1
Gel washing from PTFE latex, coagulation and drying in a static oven with hurdles at 130° C. for 20 hours In a 50 liter reactor, 5.9 liters of latex from polymerization 1A Example are fed and water until obtaining 15 liters of latex at concentration 15% w/w and temperature 24° C. The mixture is put under mechanical stirring (pitched blade stirrer—stirring specific power 3 KW/m³) and is added under stirring with $HNO_3$ at 20%, so to bring the pH of the latex diluted at 15% to the value of 1. The latex is stirred until gel is obtained.

After the gel has been formed, 30 liters of water are added at a temperature of 24° C. so to reach the predetermined dilution, added with $HNO_3$ at 20% so to bring the pH of the aqueous phase to the value of 1.

The water/gel mixture is put for 5 minutes under a stirring sufficient to shatter the gel into flocks and such to let them in close contact with the water without floating (stirring specific power 0.5 KW/m³).

When stirring is stopped and the polymer (gel) decanted; 30 liters of water are removed from the supernatant layer.

The washing procedure is repeated for further two times.

Subsequently the mixture is stirred until obtaining the powder flotation, by applying a specific power of 3 KW/m³. Stirring is stopped and the underlying water is separated from the wet fine powder.

In Table 1 the conditions at which coagulation takes place are summarized.

The wet powder (humidity 50% by weight) analyzed by the above analytical methods has a Fe cation and ammonium perfluorooctanoate content shown in Table 2.

4.5 Kg of the obtained wet powder are dried in a static oven for 1,200 minutes at 130° C. put on an AISI 316 hurdle PTFE-coated (powder thickness on the hurdle: 3 cm).

In Table 1A the conditions at which drying takes place are summarized.

The determinations carried out on the dried powder are shown in Table 3.

When the Fe amount is lower than 1 ppm, also the amount of all the other cations present has been determined. The total amount of the cations present results lower than 1 ppm.

The dried powder is characterized by capillary rheometer with reduction ratio 1:100. The resulting rheometric pressure is of 8.3 Mpa.

The appearance of the manufactured article is very good and does not show defects.

Example 2
Gel washing from PTFE latex, coagulation and drying in a static aerated oven, PEEK fabric support, at 130° C. for 20 minutes Coagulation as in Example 1 is repeated. See Table 1 and Table 2.

4.5 Kg of wet powder are dried in a static aerated oven. The support on which the powder is put is a PEEK (polyetheretherketone) fabric, the powder thickness is 3 cm, the drying temperature is 130° C. with residence time 20 minutes.

In Table 1A the conditions used for the powder drying are summarized.

The obtained dry powder, analyzed for the impurities, shows a Fe cation and ammonium perfluorooctanoate content as reported in Table 3.

When the Fe amount is lower than 1 ppm, also the amount of all the other cations present has been determined. The total amount of the cations present results lower than 1 ppm.

Table 3 shows that there are no substantial differences as regards the content of these impurities, with respect to Example 1.

The dried powder is characterized by capillary rheometer under the same above conditions. The resulting rheometric pressure is equal to 8.4 Mpa, as that of the previous Example. The appearance of the manufactured article is very good and without defects.

Example 3 (Comparative)
Coagulation from PTFE latex, powder washing and drying in a static aerated oven, PEEK fabric support, at 130° C. for 20 minutes In a 50 liter reactor, 5.9 liters of latex from Example 1A are fed and water until obtaining 15 liters of latex at concentration 15% w/w and temperature 24° C.

The mixture is put under mechanical stirring (pitched blade stirrer) and added with $HNO_3$ at 20%, so to bring the pH of the latex, diluted at 15% to the value of 1. The latex is stirred until obtaining powder flotation, by applying to the stirrer a specific power of $KW/m^3$. Lastly stirring is stopped and the water underlying the powder is separated from the wet fine powder.

The wet powder is subjected to washing for a time of 5 minutes, under stirring by applying a specific power of 3 $KW/m^3$, with 30 liters of an aqueous solution at a temperature of 24° C., acidified with $HNO_3$ at 20% so to bring the pH of the aqueous phase to the value of 1.

Finally 30 liters of washing water are eliminated.
The washing procedure is repeated for other two times.
In Table 1 the conditions at which coagulation takes place are summarized.

The wet powder analyzed by the methods illustrated in the characterization Examples shows a Fe cation and ammonium perfluorooctanoate content as reported in Table 2.

4.5 Kg of wet powder are dried in a static aerated oven. The support on which the powder is put is a PEEK fabric, the powder thickness is 3 cm, the drying temperature is 130° C., the time 20 minutes.

In Table 1A the conditions used for the drying powder are summarized.

The dry powder has a Fe cation and ammonium perfluorooctanoate content as reported in Table 3. Table 3 shows that the Fe cation content is higher than 1 ppm and the residual amount of PFOA is over the instrument detectable limit.

Therefore the results of Examples 1 and 2 with respect to comparative Example 3 show that the gel washing is a critical step to obtain a powder having the necessary requirements for the use in the semicon industry.

Example 4 (Comparative)
Coagulation from PTFE latex, using an electrolyte different from that of Example 3 (comparative), powder washing and drying in a static aereated oven, PEEK fabrique support, at 130° C. for 20 minutes In a 50 liter reactor, 5.9 liters of latex from Example 1A are fed and water until obtaining 15 liters of latex at concentration 15% w/w and temperature 24° C. The mixture is put under mechanical stirring (pitched blade stirrer) and added under stirring with a $(NH_4)_2CO_3$ solution at 15%, so to bring the pH of the latex diluted at 15% to 8. The latex is stirred until obtaining powder flotation, by applying a stirring specific power of 3 $KW/m^3$. Stirring is stopped and the underlying water is separated from the wet fine powder.

The wet powder is subjected to washing with 30 liters of water with a pH of about 7, having a temperature of 24° C. Stirring is maintained for 5 minutes by applying a specific power of 3 $KW/m^3$.

When stirring is stopped, 30 liters of aqueous solution are removed.

The washing procedure is repeated for other two times.
In Table 1 the conditions at which coagulation takes place are summarized.

The wet powder analyzed by the methods illustrated in the characterization Examples shows a Fe cation and ammonium perfluorooctanoate content as reported in Table 2.

4.5 Kg of wet powder are dried in a static aerated oven. The support on which the powder is put is a PEEK fabric, the powder thickness is 3 cm, the drying temperature is 130° C. for a time of 20 minutes.

In Table 1A the conditions used for the drying powder are summarized.

The dry powder has a Fe cation and ammonium perfluorooctanoate content as reported in Table 3. Table 3 shows that the Fe cation content is higher than 1 ppm and the residual amount of PFOA is over the instrument detectable limit.

The same comments of Example 3 can be repeated.
The dried powder is characterized by capillary rheometer R:R 1:100. The resulting rheometric pressure is equal to 9.3 Mpa.

Example 5 (Comparative)
Coagulation from PTFE latex, using the same electrolyte of Example 4 (comparative), powder washing and drying in a static aerated oven, PEEK fabric support, at 190° C. for 20 minutes.

Coagulation is repeated as in Example 4 comp. See Tables 1 and 2.

4.5 Kg of wet powder are dried in a static aerated oven. The support on which the powder is put is a PEEK fabric, the powder thickness is 3 cm, the drying temperature is 190° C. with residence time 20 minutes.

In Table 1A the conditions used for the drying powder are summarized.

The Fe cation and ammonium perfluorooctanoate content are shown in Table 3. The salt content results over the limits.

The dried powder is characterized by capillary rheometer R:R 1:100. The resulting rheometric pressure is equal to 11.3 Mpa and it is therefore much higher than that of the invention Examples. The manufactured article shows many defects (ex. roughness) and it is therefore unacceptable.

Example 6
In a 50 liters reactor 6.2 liters of latex of example 1B and water are fed until obtaining 15 liters of latex at concentration 15% w/w and temperature 24° C. The mixture is put under mechanical stirring (inclined blade stirrer—stirring specific power 3 $KW/m^3$) and is added under stirring with $HNO_3$ 20%, so as to bring the pH of the latex diluted at 14.7% to the value of 0.6. The latex is stirred until gel obtainment.

After the gel has been formed, 30 liters of water are added at a temperature of 24° C. so as to reach the predetermined dilution, the pH of the total amount of the aqueous phase is 1.

The water/gel mixture is put for 5 minutes under a stirring sufficient to shatter the gel into flocks and such as to let them in intimate contact with water without floating (stirring specific power 0.5 $KW/m^3$). When stirring is stopped and the polymer (gel) decanted, 35 liters of water are removed from the supernatant.

The washing procedure is repeated: 35 liters of water are added at a temperature of 24° C. so as to reach the predetermined dilution, with respect to the first washing. The water/gel mixture is put for 5 minutes under a stirring as in previous washing; when stirring is stopped and the polymer (gel) decanted, 35 liters of water are removed from the supernatant. This procedure (35 liters of water) is repeated for further three times. Subsequently it is stirred until obtaining powder flotation, applying specific power of 3 KW/m$^3$. Stirring is stopped and the underlying water is separated from the wet fine powder.

The waters have been analysed by sulphate determination. The sulphate values by the waters analysis, referred to the sulphate amount present on the powder after each washing, are reported in Table 4. The values show that by increasing the number of washings the amount of sulphates decreases.

The wet powder obtained after the fourth washing is already free from the initiator. The wet powder (water content 55% by weight) has a content in ammonium perfluorooctanoate of 1785 ppm (3970 ppm based on the dry polymer). See Table 2.

In Table 1 the conditions at which coagulation takes place are summarized.

4.5 Kg of the obtained powder are dried in static aerated oven. The support on which the powder is put is a PEEK fabric, the powder thickness is of 3 cm, the drying temperature is 130° C., the residence time is of 20 minutes.

In Table 1A the conditions at which drying of the powder takes place are reported. In the dry polymer are not detectable residual amounts of PFOA and sulphates (Table 3).

The dried powder is characterized by capillary rheometer with reduction ratio 1:1,600. The resulting rheometric pressure is 43 Mpa.

The aspect of the manufactured article is very good and does not show defects.

Example 7

Coagulation is repeated as in Example 6 and the wet powder obtained is as reported in Ex. 6.

9 Kg of the wet powder are dried in static aerated oven. The support on which the powder is put is a PEEK fabric, the powder thickness is of 6 cm. The drying temperature is of 130° C. with a residence time of 20 minutes.

In Table 1A the conditions at which drying takes place are reported.

The dried powder does not show discoloration.

The PFOA and SO4=residual amounts in dry polymer are undetectable (Table 3).

The dried powder is characterised by capillary rheometer with the above described methods. The resulting rheometric pressure is 43 Mpa.

The aspect of the manufactured article is very good and without defects.

Example 8 (Comparative)

In a 50 liters reactor, 6 liters of latex of Example 1B and water are fed until obtaining 15 liters of latex at concentration 14.7% by weight and temperature 24° C.

The mixture is put under mechanical stirring (inclined blade stirrer) and is added with HNO$_3$ at 20%, so as to bring the pH of the latex, diluted at 15% to the value of 1. The latex is stirred until obtaining powder flotation, applying to the stirrer a specific power of 3 KW/m$^3$. Lastly stirring is stopped and the water underlying the powder is separated from the wet fine powder.

The wet powder is subjected to washing for a time of 5 minutes, under stirring applying a specific power of 3 KW/m$^3$, with 35 liters of water at a temperature of 24° C.

Finally 35 liters of washing water are eliminated. The washing procedure is repeated for further four times.

In Table 1 the conditions at which coagulation takes place are reported.

The sulphate values in the washings are reported in table 4. The data show that after 4 washings the amount of sulphates does not decrease any more.

The wet powder shows a content in SO4$^=$=0.9 ppm (2 ppm based on the dry polymer) and ammonium perfluorooctanoate 1790 ppm (3980 ppm based on the dry polymer) as reported in Table 2.

4.5 Kg of wet powder are dried in static aerated oven. The support on which the powder is put is a PEEK fabric, the powder thickness is of 3 cm, the drying temperature is 130° C., the residence time is of 20 minutes.

In Table 1A the conditions used for the drying powder are reported. The dry powder has a content in SO4$^=$ of 1.5 ppm and ammonium perfluorooctanoate of 25 ppm (Table 3). The dried powder is characterised by capillary rheometer under the same above described conditions. The resulting rheometric pressure is 43 Mpa.

TABLE 1

Coagulation conditions used in the Examples

| Ex | PTFE Conc. % w/w | Electrolyte Type | pH | Stirring specific power in the gel formation Kw/m$^3$ | Aqueous solution Litres/Kg$_{PTFE}$ | pH | Stirring specific power in the washing step Kw/m$^3$ |
|---|---|---|---|---|---|---|---|
| 1 | 15 | HNO$_3$ | 1 | 3 | 42 | 1 | 0.5 |
| 2 | 15 | HNO$_3$ | 1 | 3 | 42 | 1 | 0.5 |
| 3 comp | 15 | HNO$_3$ | 1 | 3 | 42 | 1 | 3 |
| 4 comp | 15 | (NH$_4$)$_2$CO$_3$ | 8 | 3 | 42 | 7 | 3 |
| 5 comp | 15 | (NH$_4$)$_2$CO$_3$ | 8 | 3 | 42 | 7 | 3 |
| 6 | 15 | HNO$_3$ | 1 | 3 | 71 | 7 | 0.5 |
| 7 | 15 | HNO$_3$ | 1 | 3 | 71 | 7 | 0.5 |
| 8 comp | 15 | HNO$_3$ | 1 | 3 | 71 | 7 | 3 |

TABLE 1A

Drying conditions used in the Examples:
thickness 3 cm in all examples, except ex. 7
wherein it was 6 cm

| | Support | | | Time |
|---|---|---|---|---|
| Ex. | Type | Material | T °C. | min |
| 1 | hurdle | AISI PTFE coated | 130 | 1,200 |
| 2 | fabric | PEEK | 130 | 20 |
| 3 comp | fabric | PEEK | 130 | 20 |
| 4 comp | fabric | PEEK | 130 | 20 |
| 5 comp | fabric | PEEK | 190 | 20 |
| 6 | fabric | PEEK | 130 | 20 |
| 7 | fabric | PEEK | 130 | 20 |
| 8 comp | fabric | PEEK | 130 | 20 |

TABLE 2

Residual amounts of surfactant (PFOA) and of Fe
cation, or $SO_4^{2-}$ converted into the polymer amount

| Examples | Fe ppm | $SO_4^{2-}$ ppm | PFOA ppm |
|---|---|---|---|
| 1–2 | 0.4 | — | 4,430 |
| 3 comp | 2.7 | — | 4,530 |
| 4–5 comp | 2.5 | — | 4,480 |
| 6–7 | — | undetectable | 3,970 |
| 8 comp | — | 2 | 3,980 |

TABLE 3

Residual amounts of surfactant (PFOA) and Fe cation
or $SO_4^-$ in dried powders,
extrusion pressure of the fine powder,
(capillary rheometry; reduction ratio 1:100
for examples 1, 2, 3 comp, 4 comp, 5 comp;
reduction ratio 1:1600 for examples 6 to 8)

| Ex. | $SO_4^-$ ppm | Fe ppm | PFOA ppm | Capillary rheometry MPa RR 1:1600 |
|---|---|---|---|---|
| 1 | — | 0.3 | <10 | 8.3 |
| 2 | — | 0.3 | <10 | 8.4 |
| 3 comp | — | 1.4 | 30 | 8.8 |
| 4 comp | — | 1.5 | 50 | 9.3 |
| 5 comp | — | 1.1 | <10 | 11.3 |
| 6 | undetectable | — | <10 | 43 |
| 7 | undetectable | — | <10 | 43 |
| 8 comp | 1.5 | — | 25 | 43 |

TABLE 4

| Latex/gel | pH | $SO_4^-$ based on dry polymer ppm |
|---|---|---|
| | 1 | 7 |
| EX. 6 | | |
| After 1st washing | 1.7 | 1.5 |
| After 2nd washing | 2.4 | 0.3 |
| After 3rd washing | 3.1 | 0.05 |
| After 4th washing | 3.8 | undetectable |
| After 5th washing | 4.4 | undetectable |
| EX. 8 comp. | | |
| After 1st washing | 1.5 | 4 |
| After 2nd washing | 2.5 | 2.5 |
| After 3rd washing | 2.7 | 2.4 |
| After 4th washing | 2.8 | 2 |
| After 5th washing | 3 | 2 |

What is claimed is:

1. A process to obtain non-thermoprocessable fine powders of photopolymer or modified PTFE, comprising the following steps:
    A) obtaining of the polymer latex under the gel form;
    B) washing of the polymer gel with acid aqueous solutions or neutral aqueous solutions, having a pH from 0.5 to 7
    C) granulation of the washed gel by mechanical stirring, at a specific power in the range 1.5–10 kW/m3, until flotation of the PTFE fine powder, and separation of the floated fine powder;
    D) drying in an aerated oven of the floated fine powder at a drying temperature in the range 90° C.–160° C.

2. A process according to claim 1, carried out in batch or in a continuous way.

3. A process according to claim 2, wherein the dilution is from 8 to 20% by weight of PTFE, the temperature of the diluted latex is from 15° C. to 30° C.; the acid electrolyte is nitric acid, and the pH of the dispersion is from 1 to 3.

4. A process according to claim 1, carried out in batch, wherein step A) for obtaining the polymer latex under gel form comprises:
    dilution of the latex obtained from the polymerization in dispersion to a concentration from 2 to 25% by weight of PTFE, the temperature of the diluted latex being from 5° C. to 35° C.;
    optional filtration of the diluted latex;
    latex mechanical stirring using a specific power from 1.5 to 10 kW/m$^3$;
    addition of an acid electrolyte, and obtaining of a dispersion having pH from 0 to 3.5;
    keeping of the mechanical stirring at the above specific power until gel formation.

5. A batch process according to claim 1 wherein the washing step B), comprises the following steps:
    1) mechanical stirring stop and addition of an aqueous solution as indicated in B) in amount from 100 to 200 parts by volume of solution for 100 parts by volume of polymer gel;
    2) subsequent gel mechanical stirring using a specific power generally in the range 0.2–2 kW/m$^3$, for a time generally from 1 to 10 minutes;
    3) stirring stop, gel flock decantation and removal of the supernatant water; the washing step B) being generally repeated from 1 to 10 times.

6. A batch process according to claim 5, wherein the washing step is repeated 3 to 8 times.

7. A batch process according to claim 1, wherein the granulation step C) of the washed gel comprises the following steps:
    mechanical stirring of the washed gel by using a specific power from 1.5 to 10 kW/m$^3$, optionally adding other acid electrolyte; the gel temperature is from 5° C. to 35° C., continuing the mechanical stirring until the complete granulation and flotation of the fine powder;
    stirring stop and separation of the aqueous phase underlying the floated fine powder.

8. A batch process according to claim 7, wherein the gel temperature is from 15° C. to 30° C.

9. A continuous process according to claims 1, wherein the polymer latex under gel form (step A) comprises the following steps:
- a1) dilution in a lift of a PTFE latex obtained from the polymerization in dispersion (emulsion) to a concentration from 5 to 25% w/w of PTFE, and optional filtration of the diluted latex,
- b1) latex pressurization in the lift by an inert gas, until a pressure, related to the atmospheric pressure, in the range 3–40 kg/cm$^2$ (0.3–4 MPa),
- c1) addition of a solution of an acid electrolyte to the PTFE latex, in a in-line mixer, so that the pH is from 1 to 4,
- d1) latex flowing from the mixer through a capillary tube for the gel obtaining.

10. A continuous process according to claim 9, wherein the acid electrolyte is nitric acid.

11. A process according to claim 1, wherein the modified PTFE which forms the non thermoprocessable fine powders contains hydrogenated and/or fluorinated comonomers, having at least one unsaturation of ethylene type in an amount from 0 to 3% by moles.

12. A process according to claim 11, wherein the hydrogenated and/or fluorinated comonomers are in an amount from 0.01 to 1% by moles.

13. A process according to claim 11, wherein the hydrogenated comonomers are selected from ethylene, propylene, acrylic monomers, preferably methyl methacrylate, (meth) acrylic acid, butylacrylate butylacrylate, hydroxyethyl hexylacrylate and styrene monomers.

14. A process according to claim 11, wherein the fluorinated comonomers are selected from the following:
- $C_3$–$C_8$ perfluoroolefins;
- $C_2$–$C_8$ hydrogenated fluoroolefins, selected from vinyl fluoride (VF), vinylidene fluoride (VDF), trifluoroethylene, hexafluoroisobutene and perfluoroalkylethylene $CH_2=CH-R_f$ wherein $R_f$ is a $C_1$–$C_6$ perfluoroalkyl;
- $C_2$–$C_8$ chloro- and/or bromo- and/or iodo-fluoroolefins;
- (per)fluoroalkylvinylethers (PAVE) $CF_2=CFOR_f$, wherein $R_f$ is a $C_1$–$C_6$ (per) fluoroalkyl;
- (per)fluoro-oxyalkylvinylethers $CF_2=CFOX$, wherein X is: a $C_1$–$C_{12}$ alkyl, a $C_1$–$C_{12}$ oxyalkyl, a $C_1$–$C_{12}$ (per)fluoro-oxyalkyl having one or more ether groups;
- fluorodioxoles;
- non-conjugated dienes of the type:

$CF_2=CFOCF_2CF_2CF=CF_2$,
$CFX^1=CX^2OCX^3X^4OCX^2=CX^1F$, wherein $X^1$ and $X^2$, equal to or different from each other, are F, Cl or H; $X^3$ and $X^4$, equal to or different from each other, are F or $CF_3$, which during the polymerization cyclopolymerize;

fluorovinylethers (MOVE) of general formula:
$CFX_{AI}=CX_{AI}OCF_2OR_{AI}$ (A–I) wherein $R_{AI}$ is a $C_2$–$C_6$ linear, branched or $C_5$–$C_6$ cyclic (per) fluoroalkyl group, or a $C_2$–$C_6$ linear, branched (per)fluorooxyalkyl group, containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}$=F, H.

15. A process according to claim 14, wherein
the $C_3$–$C_8$ perfluoroolefins are hexafluoropropene (HFP);
the $C_2$–$C_8$ chloro- and/or bromo- and/or iodofluoroolefins are chlorotrifluorethylene (CTFE);
the (per)fluoroalkylvinylethers (PAVE) $CF_2=CFOR_f$, wherein $R_f$ is the $C_1$–$C_6$ (per)fluoroalkyl, is selected from a group consisting of $CF_3$, $C_2F5$, and $C_3F_7$;
the $C_1$–$C_{12}$ (per)fluoro-oxyalkyl is perfluoro-2-propoxy-propyl;
the fluorodioxoles are perfluorodioxoles;
the fluorovinylethers (MOVE) are selected from a group consisting of $CFX_{AI}=CX_{AI}OC-F_2OCF_2CF_2Y_{AI}$(A-III), (MOVE I) $CF_2=CFOCF_2OCF_2CF_3$ (A-III) and (MOVE II) $CF_2=CFOCF_2OCF_2CF_2OCF_3$ (A-IV).

16. A process according to claim 1, wherein the acid electrolyte is an inorganic acid.

17. A process according to claim 16, wherein the acid electrolyte is nitric or hydrochloric acid.

18. A process according to claim 1, wherein in the drying step D), the used substances put at direct contact with the PTFE fine powder, are polymers selected from PTFE, PVDF, FEP (optionally modified with vinylethers), PFA, MFA, and PEEK.

19. PTFE or modified PTFE fine powders obtainable according to claim 1, having a residual amount of inorganic cations <1 ppm and of surfactants <10 ppm.

20. Use of the PTFE or modified PTFE fine powders of claim 19 in the lubricated extrusion.

21. A process according to claim 1, wherein the acid aqueous solutions or neutral solutions have a pH from 1 to 4 and the drying temperature is in a range from 105° C.–150° C.

* * * * *